Figure 1:
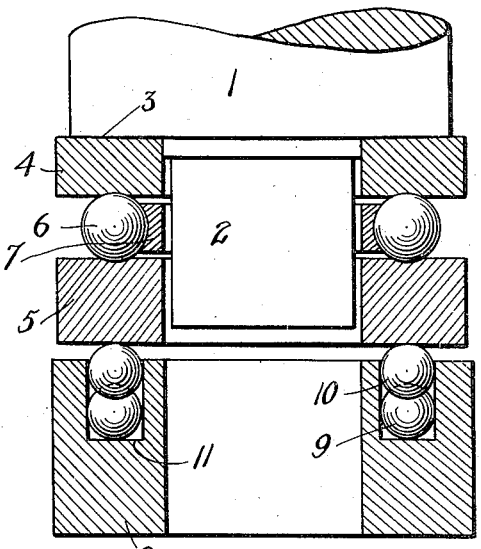

L. H. BRINKMAN.
THRUST BEARING.
APPLICATION FILED DEC. 6, 1916.

1,320,836.

Patented Nov. 4, 1919.

INVENTOR
Louis H. Brinkman
BY
Thomas Howe ATTORNEY

UNITED STATES PATENT OFFICE.

LOUIS H. BRINKMAN, OF GLEN RIDGE, NEW JERSEY, ASSIGNOR TO BALL ROLLED TUBE CORPORATION, A CORPORATION OF NEW YORK.

THRUST-BEARING.

1,320,836.   Specification of Letters Patent.   Patented Nov. 4, 1919.

Application filed December 6, 1916. Serial No. 135,294.

*To all whom it may concern:*

Be it known that I, LOUIS H. BRINKMAN, a citizen of the United States, residing at Glen Ridge, county of Essex, and State of New Jersey, have invented new and useful Improvements in Thrust-Bearings, of which the following is a specification.

This invention relates to bearings which are automatically adjustable to compensate for variations in alinement which may be produced by eccentricities in operation, inaccuracy in assembling or from other causes.

If a shaft does not run true there is a reciprocation of the axis of the shaft causing it to tilt from one position to another with relation to its bearing. This, if the bearing is inflexible, results in shifting of the weight from one portion of the bearing to another, the pressure at any given time being concentrated upon a restricted portion of the bearing instead of distributed over the whole. This results in excessive wear in some parts of the bearing over the others and may even result in breakage. This is especially true of ball bearings. It is also true that with inflexible bearings, while the shaft may remain true after installation it may not have been properly alined with the bearings originally with a resultant concentration of pressure and liability to damage as just pointed out.

It is an object of the invention to provide a bearing which shall automatically adjust itself to a tilted or eccentrically operating shaft so that the concentration of pressure at certain points and excessive wearing or breakage of parts will be avoided. To accomplish this result, supported and supporting members are separated by superposed layers of bodies, the bodies of the different layers being separated by interstices into which the bodies of adjacent layers may enter to a greater or less degree. These layers of bodies are inclosed in a chamber which is substantially filled by them, the extreme layer at one side bearing against one member and against the layer of bodies adjacent it, while the layer of bodies at the other extreme bears against the other member on the one side and against its adjacent layer of bodies on the other side. If there is any tilting of one of the members with relation to the other member from which it is separated by the superposed series of bodies, there will be at one portion of the chamber between them a pushing of the bodies together causing the bodies of the different layers to enter the interstices of the different layers. This restriction of the chamber and consequent spreading out of the bodies laterally at one portion of the chamber will be accompanied by an extension of it at another point and the laterally moving bodies being forced into this extended portion will cause the bodies of the layers to move closer together constricting the interstices and forcing the bodies out of the spaces. Thus any tilting will be attended by corresponding depression and elevation of the superposed bodies so that they always maintain full contact between the separated members.

Other and ancillary objects of the invention will appear hereinafter.

In the accompanying drawing the invention is shown by way of illustration as applied to a thrust bearing at the end of a vertical shaft. Of this drawing:—

Figure 2:
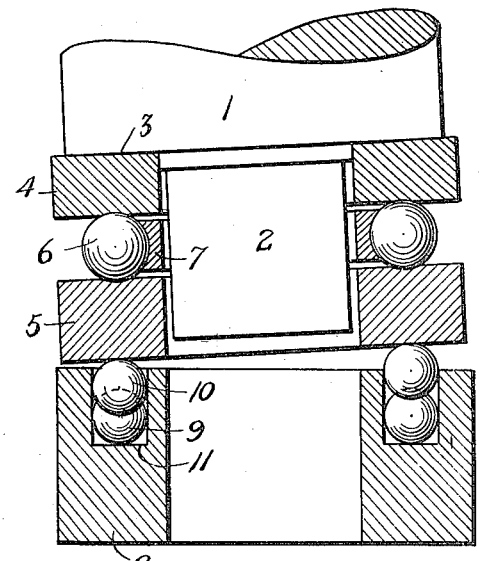
Figure 3:
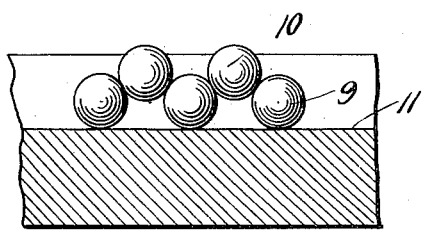
Figure 4:
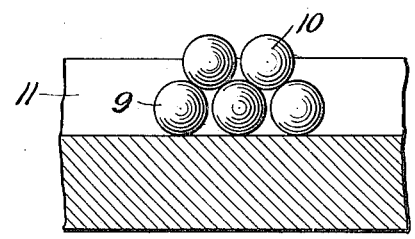
Figure 5:
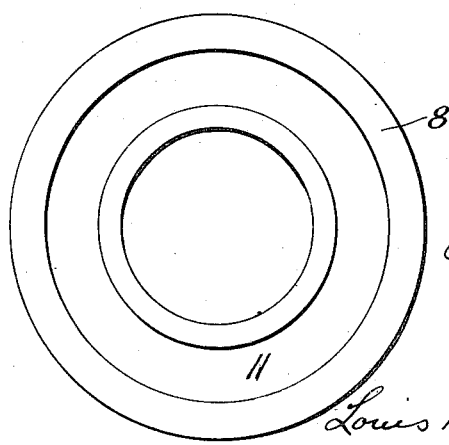

Figure 1 is a vertical section of a bearing embodying the invention in which the shaft is shown as plumb, Fig. 2 is a similar view showing the parts when the shaft is tilted, Fig. 3 is a view in side elevation of a fragment of the bearing showing the arrangement of superposed balls on the depressed side when the shaft is tilted, Fig. 4 is a similar view on the elevated side, and Fig. 5 is a top plan view of the base block of the apparatus of Figs. 1 and 2.

Referring to the drawings, 1 is a vertical shaft having a reduced section 2, forming a shoulder 3 resting upon a race ring 4 of a ball bearing. The race ring 4 is separated from a race ring 5 by the circular series of balls 6, held in suitable spaced relation by a cage 7. The lower race ring 5 is supported from the base block 8 by means of two superposed series of balls 9 and 10. These balls are contained in a circular channel 11 in the base block. The lower series of balls 9 bears on the bottom of this channel and at the other side bears against the superposed series of balls 10. The series 10 project above the top of the base block and upon the side opposite that upon which they bear against the series 9, they bear against the bottom of the race ring 5. It is preferable to provide a ball bearing 6, but this is not necessary in all cases. Sometimes the shaft might bear directly upon the uppermost of the superposed series of balls. In either case the latter will provide automatic adjustment.

With the apparatus plumb as shown in Fig. 1, the superposed series of balls are at the same height all around, distributing the support uniformly about the ring 5. If the axis of the shaft becomes tilted as shown in Fig. 2, the balls of the respective series 9 and 10 on the left hand, that is on the depressed side, will be forced farther into the interstices between the balls of the other layer thereby expanding the balls circumferentially upon that side (see Fig. 3). This will force the balls around to the other side of the bearing, that is, the right hand side as shown in Fig. 2. Pressure having been relieved on this side, the balls are forced closer together. This tends to force the balls of one series out of the interstices of the other series with the result that the two series extend upwardly to a greater height and come in contact with the ring 5. It will thus be seen that the depression on one side causes the depression of the balls on that side. This forces an elevation of the balls on the other side by a corresponding amount. For every depression of the balls on one side there is a corresponding elevation of the balls on the other side so that at all times the balls are in contact entirely about the bearing.

While the invention has been illustrated in what is considered its best application, it may have other embodiments without departing from its spirit and is not therefore limited to the structure shown in the drawings.

What I claim is:—

1. The combination with a rotatable shaft, of means for receiving the axial thrust thereof, comprising two members, one of said members having an unobstructed groove encircling the axis of said shaft and the other of said members being circumferentially continuous, and a plurality of series or layers of balls spacing said members apart, the said series of balls bearing against the said members, bearing at their other sides upon the balls of adjacent layers, the balls of a layer being separated by interstices within which the balls of an adjacent layer may move back and forth.

2. The combination with a bearing of an abutment therefor comprising two members, one of said members having an unobstructed groove encircling the axis of the bearing, and the other of said members being circumferentially continuous and a plurality of series or layers of balls spacing said members apart, the said series of balls bearing against the said members, bearing on their other sides against the bodies of adjacent layers, the balls of a layer being separated by interstices within which the balls of an adjacent layer may move back and forth.

3. The combination with a rotatable shaft, of means for receiving the axial thrust of said shaft comprising a pair of race-rings surrounding the axis of the shaft and including between them a series of balls, said rings being circumferentially continuous and forming the race-rings for the said balls constituting a ball bearing, and an abutment for said ball bearing comprising a base block having an unobstructed groove encircling the axis of the shaft and a plurality of series or layers of balls spacing and supporting one of said race-rings from said base block, said last mentioned series or layers of balls being in said groove and those series of balls which respectively bear against the last mentioned race-ring and said base block, at their other sides bear upon adjacent layers of balls, the balls of a layer being separated by interstices within which the balls of an adjacent layer may move back and forth.

In testimony whereof I have signed this specification this 28th day of November, 1916.

LOUIS H. BRINKMAN.